United States Patent [19]

Haas et al.

[11] Patent Number: 5,707,240

[45] Date of Patent: Jan. 13, 1998

[54] ALBUM WITH MEANS FOR MAGNETICALLY DETERMINING PAGE POSITION

[75] Inventors: Kenneth Michael Haas, Oakfield; David Reynolds Dowe, Holley; Svetlana Reznik, Rochester, all of N.Y.

[73] Assignee: Eastman Kodak Company, Rochester, N.Y.

[21] Appl. No.: 625,565

[22] Filed: Mar. 28, 1996

[51] Int. Cl.[6] ................................... G09B 5/00
[52] U.S. Cl. .................. 434/317; 434/308; 434/330; 434/409
[58] Field of Search ................ 434/73, 134, 168, 434/190, 301, 308, 309, 311, 315, 316, 317, 330, 409

[56] References Cited

U.S. PATENT DOCUMENTS

| | | |
|---|---|---|
| 3,220,126 | 11/1965 | Gabrielsen . |
| 3,522,665 | 8/1970 | Kalt . |
| 3,857,191 | 12/1974 | Sadorus . |
| 4,138,057 | 2/1979 | Atalla . |
| 4,299,041 | 11/1981 | Wilson . |
| 4,418,278 | 11/1983 | Mondshein . |
| 4,636,881 | 1/1987 | Brefka et al. . |
| 4,748,756 | 6/1988 | Ross . |
| 4,791,741 | 12/1988 | Kondo . |
| 4,809,246 | 2/1989 | Jeng . |
| 4,884,974 | 12/1989 | DeSmet . |
| 4,990,092 | 2/1991 | Cummings . |
| 5,063,698 | 11/1991 | Johnson et al. . |
| 5,167,508 | 12/1992 | Mc Taggart . |
| 5,290,190 | 3/1994 | McClanahan . |
| 5,313,235 | 5/1994 | Inoue et al. . |
| 5,359,374 | 10/1994 | Schwartz . |
| 5,374,195 | 12/1994 | McClanahan ............ 434/317 |
| 5,417,575 | 5/1995 | McTaggart . |
| 5,520,544 | 5/1996 | Manico et al. ............ 434/317 |

FOREIGN PATENT DOCUMENTS 0609048  8/1994  European Pat. Off. ............. 434/317

*Primary Examiner*—Richard J. Apley
*Assistant Examiner*—Glenn E. Richman
*Attorney, Agent, or Firm*—Charles E. Snee, III; David A. Howley

[57] ABSTRACT

An album includes a plurality of pages and another portion such as a front and/or back cover, or a binder. A plurality of magnets are positioned at respective relative locations on one of the album portion or the plurality of pages. A plurality of magnetic field sensor means, such as Hall effect sensors, are positioned at respective relative locations on the other of the album portion or the plurality of pages which substantially match the respective locations of the plurality of magnets for sensing the position of each page relative to the other portion.

15 Claims, 4 Drawing Sheets

ALBUM WITH MEANS FOR MAGNETICALLY DETERMINING PAGE POSITION

CROSS-REFERENCE TO RELATED APPLICATION

Reference is made to commonly assigned copending application Ser. No. 08/411,138 entitled Talking Picture Album and filed on Mar. 27, 1995 in the names of Manico et al.

FIELD OF THE INVENTION

The invention relates generally to the field of information presentation, and in particular to albums. More specifically, the invention relates to an album with means for magnetically determining page position.

BACKGROUND OF THE INVENTION

Albums (books) which provide audio information corresponding to the image and/or alphanumeric information on the pages are known in the prior art. For example, U.S. Pat. No. 4,990,092 discloses a talking book including a power source, switches, voice chips and a speaker, all of which are mounted within the book and act together to "read" the words written on pages in the book. The switches are pressure sensitive types, and marked areas on the pages are pressed in order to activate the switches and the chips in order to produce words or other sounds. Requiring the book reader to press portions of the page to produce audio information is inconvenient, especially if the reader is a parent holding a small child in their lap. See also U.S. Pat. No. 5,290,190.

The prior art provides several solutions to this problem which enable audio information to be produced automatically as the pages of the album are turned. For example, U.S. Pat. No. 4,884,974 discloses a talking book having a back cover to which a ROM module is attached. The ROM module stores digitally recorded spoken texts corresponding to texts printed on the pages of the book. Printed on the end margins of each page is a page identifying binary bar code. An audio player is mounted to the back cover and engages the ROM module for converting the digitally recorded texts into audio signals which are amplified and reproduced. When the pages are turned, they overlie a base inlet of the player, the bar code on the open page being then exposed to ambient light. The reflective portions of the bar code reflect the ambient light toward an array of light sensors mounted above the base inlet, thus producing binary signals identifying the open page. The binary signals causes the speech unit to read-out from the ROM module the spoken text corresponding to the printed text on the open page whereby the reader of the text hears what (s)he is reading.

A problem with the talking book described in the previous paragraph, as with all systems that rely on optical detection of page position, is that dirt, dust, etc. can, over time, block light from reaching the light sensors, thus degrading the operability of the system. Further, relying on ambient light reduces the robustness of such a talking book. If the book is being viewed under low light conditions, such as before putting a child to bed, insufficient light may be available to stimulate the light sensors. Conversely, under very bright conditions, light sensors which are not supposed to be exposed to light may be exposed, possibly causing incorrect audio information to be played. Some systems (e.g. that disclosed in U.S. Pat. No. 4,636,881) rely on a light emitter, such as an infrared source, to provide the light for stimulating the light sensors. Having a light source requires additional parts and wiring, thus increasing the cost and complexity of the book. A light source also accelerates the depletion of battery electrical power.

SUMMARY OF THE INVENTION

The present invention is directed to overcoming one or more of the problems set forth above. Briefly summarized, according to one aspect of the present invention, an album includes a plurality of pages and another portion. A plurality of magnets are positioned at respective relative locations on one of the album portion or the plurality of pages. A plurality of magnetic field sensor means are positioned at respective relative locations on the other of the album portion or the plurality of pages which substantially match the respective locations of the plurality of magnets for sensing the position of each page relative to the other portion.

By relying on magnetism to determine page position rather than light, the present invention will not be inhibited by the accumulation of dust or dirt which may cover the magnets and/or the magnetic field sensors. This is because a magnetic field is not inhibited by such debris. Further, the present invention will operate without fail under light conditions ranging from dim to extremely bright. Additionally, the magnets of the present invention do not require an electrical power source as does the light source described above. Consequently, the present system requires less electrical power than an optical system which includes a light source.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
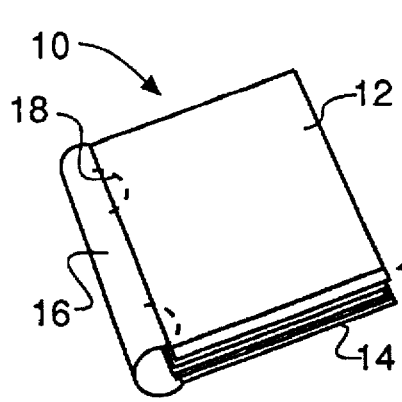
FIG. 1 is a schematic perspective view of an album according to the present invention in a closed state.
Figure 2:
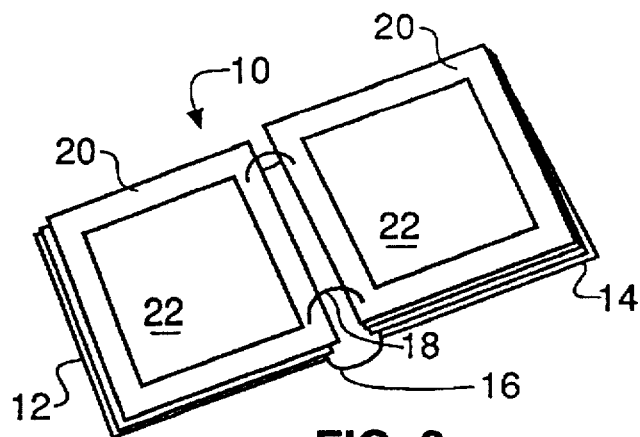
FIG. 2 is a schematic perspective view of the album of FIG. 1 in an open state.

Beginning with FIGS. 1 and 2, an album (book), designated generally by the reference numeral 10, includes a front cover 12, a back cover 14 and a binder 16 for joining the front and back covers together. FIG. 1 shows the album in a closed position and FIG. 2 shows the album in an open position. A pair of binder rings 18, attached to binder 16, secure a multiplicity of pages 20 into album 10. In this embodiment there are seven pages in the album. Each page includes a pair of holes through which binder rings 18 pass. As is known in the art, the binder rings can be manually opened for inserting and removing pages from the album, and then closed to secure pages 20 into the album. The pages can support photographs 22, or have information printed thereon such as images, text and/or numbers.

Figure 3:
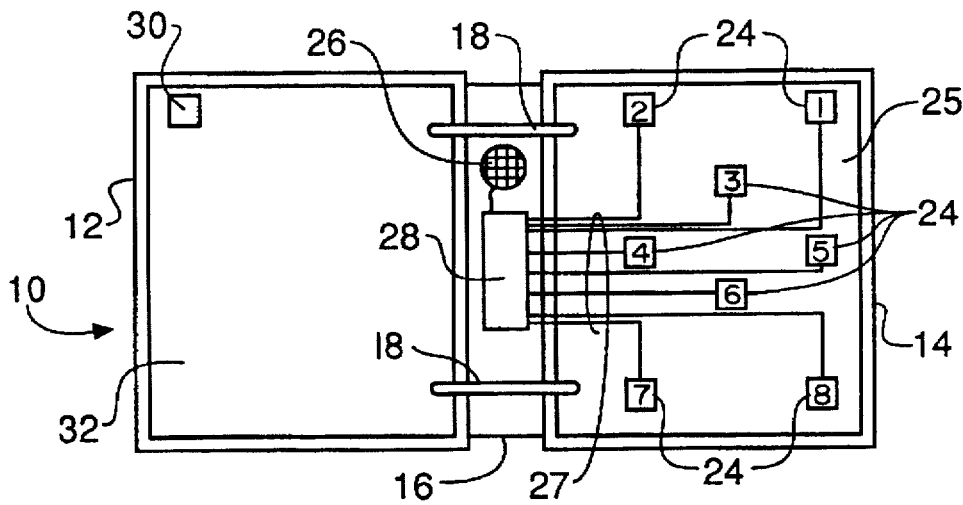
FIG. 3 is a top view of the album of FIG. 2 with pages removed from the album

Turning to FIG. 3, album 10 is shown in an open position with all of the pages removed from the album. Back cover 14 includes 8 Hall effect sensors 24 which can sense a magnetic field which is at or above a certain field strength. Optional to using Hall effect sensors, omnipolar magnetoresistive sensors with integrated amplifiers can be used. Sensors 24 are secured to an inside surface 25 of the back cover by, for example, an adhesive and may be covered with a plastic sheet to hide them from view. A speaker 26 for reproducing audio information is secured to binder 16. Each sensor 24 is electrically connected to a speaker controller 28 (described in greater detail below) by one of wires 27. A permanent magnet 30 is attached to an inside surface 32 of front cover 12. When album 10 is in a closed position (FIG. 1), magnet 30 will overlie sensor "1" which will be able to sense the magnetic field from magnet 30. When album 10 is in an open position (FIG. 3), magnet 30 will be removed from sensor "1" which will not be able to sense the magnetic field from magnet 30. Sensor "1" sends an appropriate signal to controller 28 to indicate whether the album is in an opened or closed state.

Figure 4:
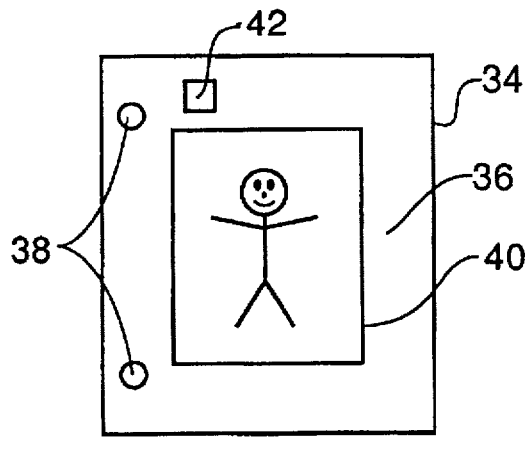
FIGS. 4 and 5 are top views of album pages.
Figure 5:
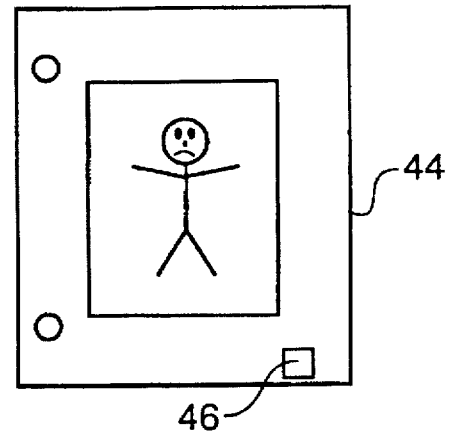

Referring to FIGS. 4 and 5, pages which are securable into album 10 will be described. FIG. 4 discloses a first page 34 of album 10. Page 34 includes a side A surface 36 and a side B surface (hidden from view) opposite the side A surface. Page 34 includes a pair of holes 38 through which binder rings 18 (FIG. 2) can be passed to secure page 34 into the album. In this embodiment, a photograph 40 has been secured to side A of page 34. Of course, more than one photograph can be secured to a side of the page. Optionally, page 34 may have text and or images pre-printed on the sides of the page such as is found in a book.

Page 34 includes a permanent magnet 42 attached to the page. Magnet 42 can be mounted on a surface of the page or be imbedded within the page if the page is thick enough. When page 34 is secured in album 10 and the album is closed, magnet 42 will be adjacent sensor "2" (FIG. 3) which can sense the magnetic field from magnet 42. When album 10 is opened and page 34 is moved away from back cover 14, sensor "2" can no longer detect the magnetic field from magnet 42. Any time album 10 is in an opened position, sensor 2 will provide an indication to controller 28 whether page 34 is adjacent to back cover 14 or not adjacent to back cover 14 (either adjacent to front cover 12 or being moved towards or away from front cover 12).

FIG. 5 discloses a seventh page 44 of album 10. Page 44 is similar to page 34 except that a permanent magnet 46 is located in a lower right corner of the page rather than an upper left corner of the page. As such, magnet 46 will overlie sensor "8" when page 44 is secured in album 10 and the album is closed. Once again, sensor "8" magnetically detects the position of page 44 relative to back cover 14 when album 10 is opened and relays this information to controller 18. Similar permanent magnets are provided on pages two through six at respective locations corresponding to sensors "3" through "7". The layout of sensors 24 and the magnets is arranged to minimize interaction of the magnet fields with each other and with an inappropriate sensor. Magnets 34 and 44 are shown on side A of pages 34 and 44 for ease of explanation, but it is preferable for the magnets to be located on side B of each page so that the magnets will be closer to their respective sensor when the album is closed. By knowing the position of each page relative to back cover 14, controller 28 can cause audio information associated with images and/or textual information presently being viewed to be played (to be described in greater detail below).

The permanent magnets used in the present invention are preferably made of neodymium iron boron or other magnetic material having a magnetic field strength of between about 25-27 mega-oersteds or more. Preferably, the magnets are each between about 0.020" (0.051 cm) and 0.200" (0.508 cm) thick and have a surface area sufficient to compensate for any page shifting in a direction perpendicular to the direction of page movement within the album (e.g. about 0.500" (1.270 cm) by 0.500" (1.270 cm)). Sensors 24 are preferably sensitive to as little as 15 Gauss of magnetic field, thus allowing a relatively large sensor-to-magnet separation (e.g. up to 3.81 cm with a 0.508 cm thick magnet) when the album is closed. Omnipolar operation of sensors 24 ensures functionality of the system regardless of which way the magnets are oriented.

Figure 6:
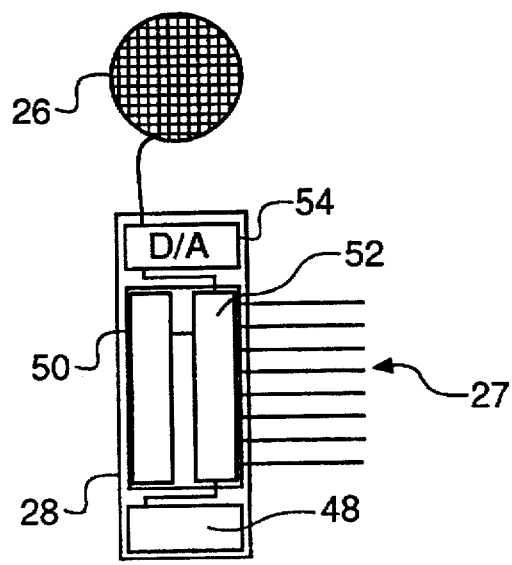
FIG. 6 is a top schematic view of a speaker and its controller.

Turning to FIG. 6, a more detailed description of speaker controller 28 will be provided. Controller 18 includes a power supply 48 such as one or more batteries. A memory 50, such as a read only memory (ROM), digitally stores audio information associated with pictures 22 or other visual information on the album pages. A microprocessor 52 operates controller 28. The microprocessor receives cover and page position information over wires 27 from sensors 24 (FIG. 3). In response thereto, microprocessor 52 determines which sides of which album pages, if any, are presently being viewed by a person. The microprocessor then extracts digital audio information from memory 50 related to the visual information on the page sides being viewed, and transmits this digital audio information to a digital-to-analog converter 54. Converter 54 converts the digital audio information to an analog audio signal appropriate for driving speaker 26. The analog audio signal is applied to speaker 26 to reproduce the audio information associated with the visual information presently being viewed in the album.

Figure 7:
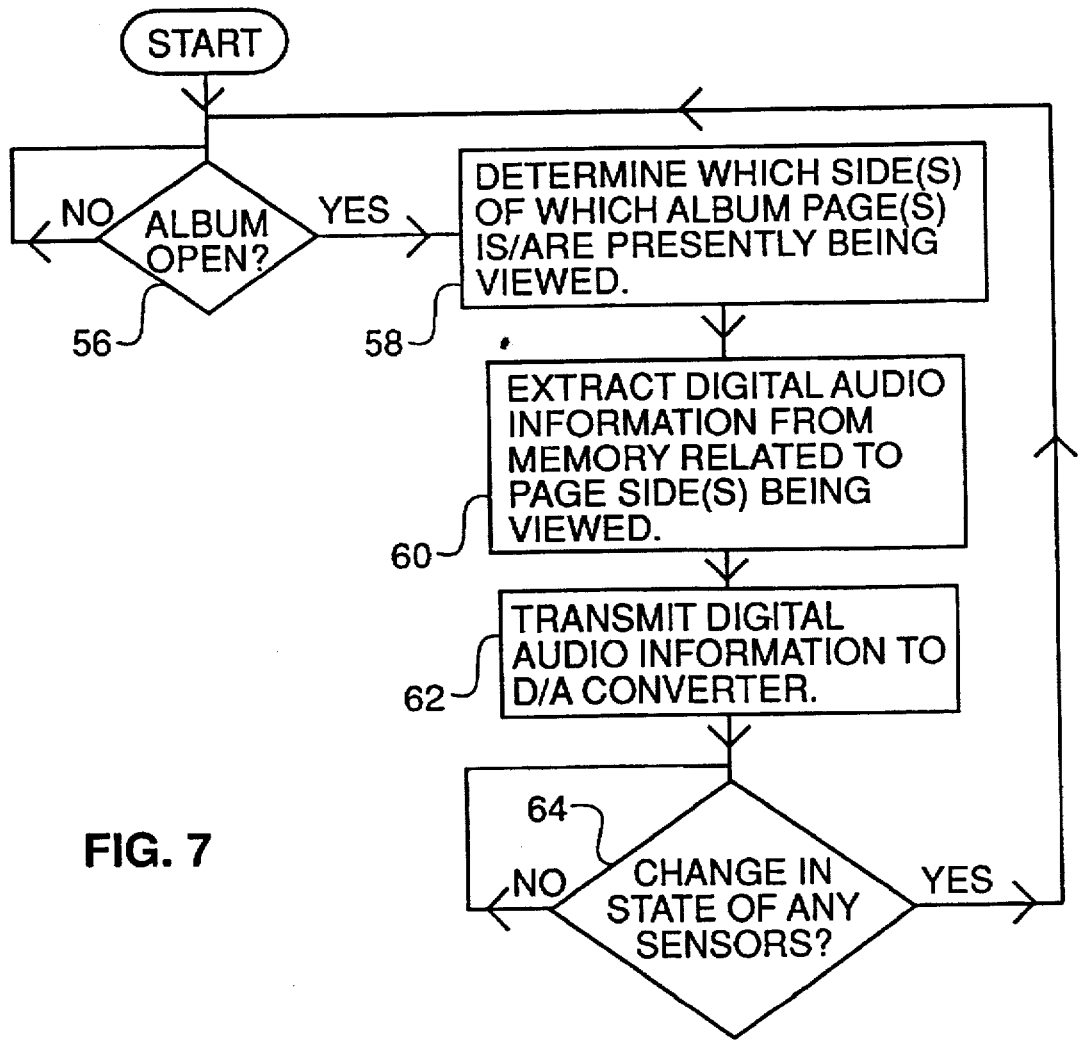
FIG. 7 is a logic flow diagram used by the controller of FIG. 6.

With reference to FIGS. 3 and 7, a description of logic used by microprocessor 52 will be described. At a step 56, microprocessor 52 determines whether or not album 10 is opened. This is accomplished by looking at the state of sensor "1". If sensor "1" is providing a high signal to the microprocessor, that indicates sensor "1" is detecting a magnetic field from magnet 30 and the album is closed. If sensor "1" is providing a low signal to the microprocessor, that indicates sensor "1" is not detecting a magnetic field from magnet 30 and the album is open.

Once the album has been opened, microprocessor 52 determines at a step 58 which page sides are presently being viewed. This is accomplished by looking at the states of sensors "2" through "8". If sensors "2" through "8" are all providing a high signal to the microprocessor, that indicates that each sensor is detecting the magnetic field from its corresponding magnet. Thus, all the pages are adjacent to back cover 14 and the side A surface 36 of first page 34 is being viewed. Likewise, if sensors "2" through "4" were sending a low signal to the microprocessor while sensors "5" through "8" were sending a high signal to the microprocessor, that would indicate that side B of page 3 and side A of page 4 were presently being viewed.

Once microprocessor 52 has determined which page sides are being viewed, the microprocessor extracts digital audio information from memory 50 at a step 60. This digital audio information corresponds to visual information presented on the page sides being viewed. At this point, an optional time delay may be incorporated into the logic to allow the album viewer time to finish turning a page before audio information is reproduced on the speaker. At a step 62, the extracted digital audio information is transmitted to D/A converter 54 where the digital audio information is converted to an analog audio signal appropriate for driving speaker 26. The analog audio signal is then applied to speaker 26 to reproduce audio information associated with visual information provided on the page sides being viewed.

At a step 64, microprocessor 52 scans sensors "1" through "8" to see if there has been a change in state of any of the sensors. If there has been no change of state of any of the sensors, the logic remains at step 64. If there has been a change of state of any of the sensors, the logic returns to step 52. A manually operable button (not shown) may be provided on controller 18 which can be pressed by a viewer of the album to repeat the playing of the last audio information that was played. This feature would be used if a viewer wanted to hear audio information again before turning the page or closing the album.

Figure 8:
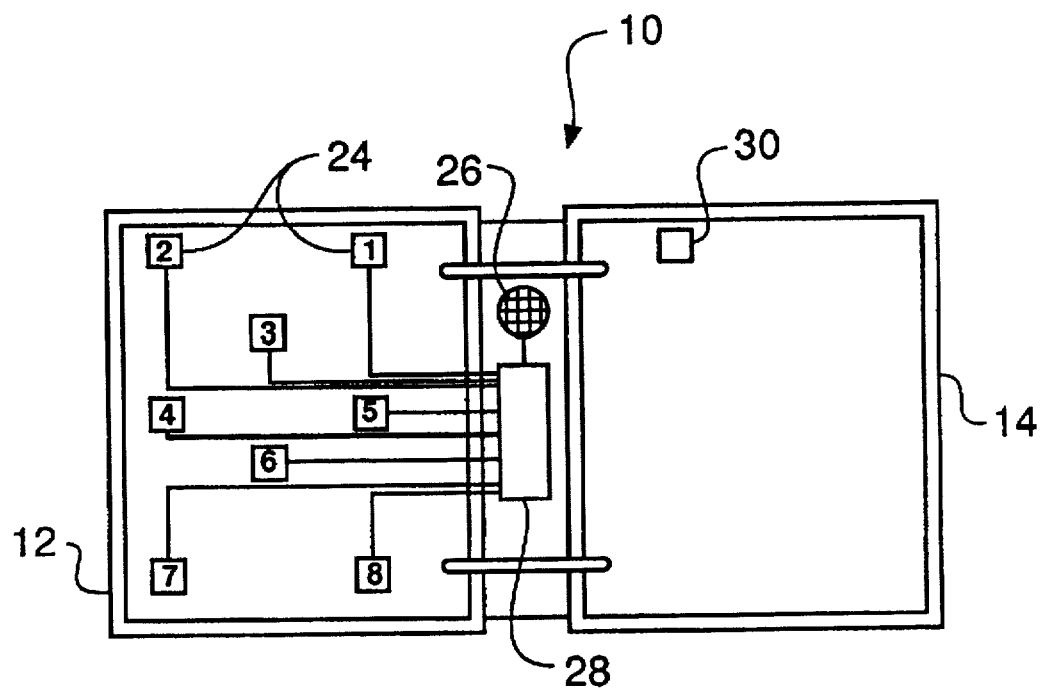
FIGS. 8 and 9 are alternative embodiments of the invention.

FIG. 8 discloses a second embodiment of the invention in which sensors 24 are located on a front cover 12 of album 10 instead of back cover 14. Other than that difference, the second embodiment functions essentially the same as the first embodiment described above. An advantage of the second embodiment is that reproduction of audio information by speaker 26 will not commence until a page has been turned substantially completely from the back cover to the front cover (right-to-left). As people naturally tend to turn pages from right to left, this embodiment inherently delays commencement of audio information reproduction until the page has been completely turned, thus lessening the need for a time delay as described above with reference to the first embodiment.

Figure 9:
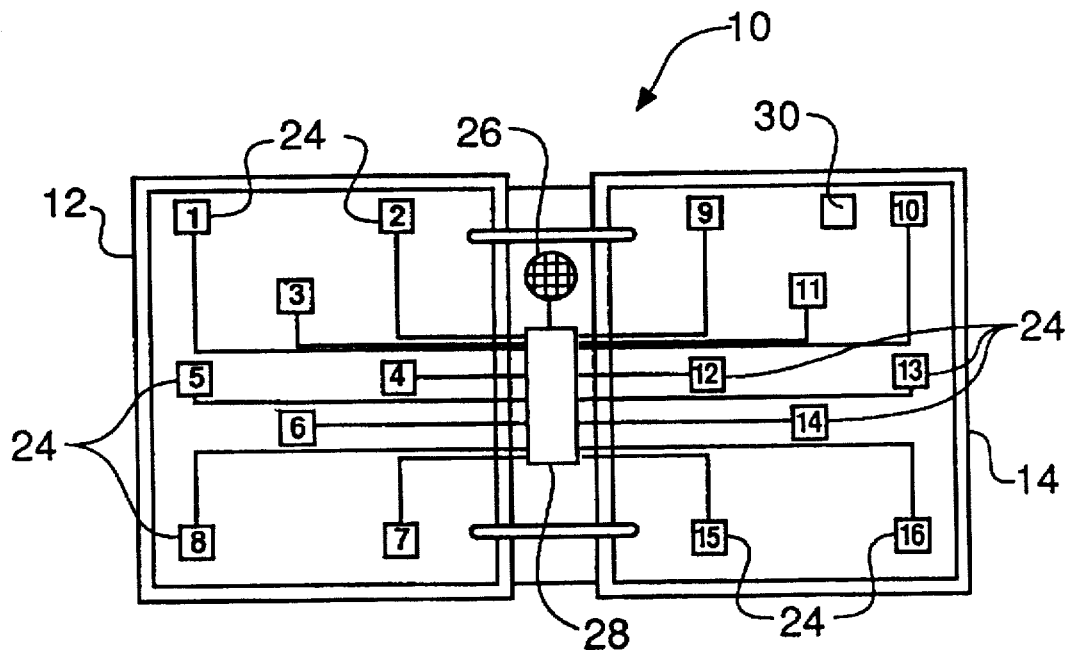

FIG. 9 discloses a third embodiment of the invention in which sensors 24 are located on front cover 12 and back cover 14 of album 10. The sensors on the front and back covers are arranged so that they will not overlap each other when the album is closed. Such an arrangement allows fifteen pages to be used in the album rather than seven. Again, the third embodiment of the invention functions essentially the same as the first embodiment described above.

Figure 10:
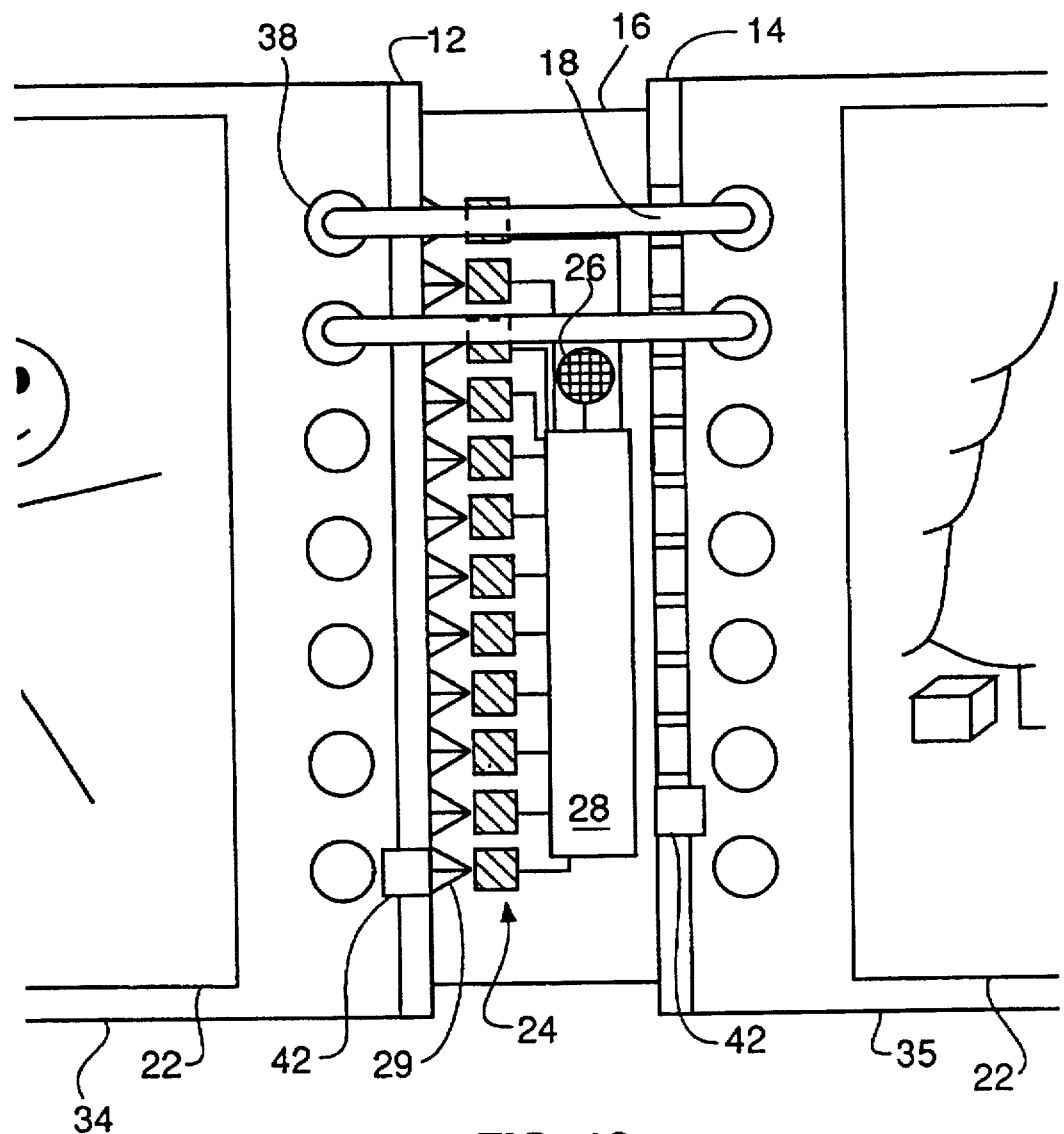
FIG. 10 is a top view of a further alternative embodiment of the invention.
Figure 11:
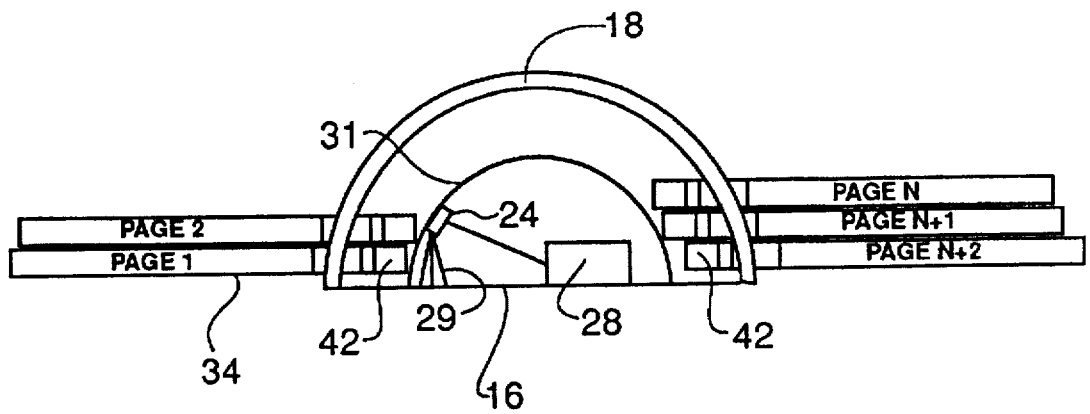
FIG. 11 is a side view of the embodiment of FIG. 10.

Turning to FIGS. 10 and 11, a fourth embodiment of the invention will be described. Photographs 22 are secured to album pages 34 and 35 in any conventional manner. The album pages are secured into the album by binder rings 18 which protrude through a series of holes 38 in each page (five binder rings are not shown in FIG. 10 to allow other elements to be viewed). Each page has a permanent magnet 42 secured to the page at an edge of the page adjacent binder 16. The magnets are arranged such that they will not overlap each other when all of the pages are stacked up in the album. Sensors 24 are now located on binder 16 rather than on the front and/or back album cover as described in previous embodiments. Each sensor is held in position by a support 29. A speaker 26 and controller 28 as described above are again located on binder 16. An opaque plastic cover tube 31 protects the sensors, controller 28 and speaker 26 from damage, and enhances the appearance of the album by hiding these elements from view.

As shown in FIG. 11, sensors 24 are located not in the middle of the binder but towards the front cover side of the album. Each sensor can detect a magnetic field from its associated permanent magnet when that magnet's page is located on the front cover side of the album. When the page is located on the back cover side of the album, its magnet is too far from the associated sensor and the sensor cannot detect the magnetic field from the magnet. As described above, the microprocessor in speaker controller 28 determines page position using input from all the sensors 24, and then causes audio information, relating to photographs being viewed, to be reproduced by speaker 26.

The fourth embodiment of the present invention offers several advantages. As the magnetic flux from each magnet is projected directly onto its sensor, rather than through potentially a number of pages, smaller magnets can be used, thus lowering the size, weight and cost of the album. With no sensors on the front and/or back covers of the album, these covers can be made thinner, thereby improving the "natural feel" of the album.

Although it is preferred to have the magnets on the album pages and the sensors on the front and/or back covers, or on the binder, the reverse may also be done. That is, sensors 24 can be secured to each of the pages while the magnets are secured to the front and/or back cover, or to the binder. In this case, a flex circuit is used to connect each of the sensors on the pages to the microprocessor in controller 28. Further, although permanent magnets are described in the embodiments above, electromagnets could also be used. This would require electrically connecting each electromagnet to the power source (battery). If the electromagnets are located on the pages, a flex circuit is used to make this connection.

The invention has been described with reference to a preferred embodiment. However, it will be appreciated that variations and modifications can be effected by a person of ordinary skill in the art without departing from the scope of the invention. For example, rather than using a magnet and sensor to detect when the album has been opened, a mechanical switch actuated by opening and closing the album can be used to turn the power supply (battery) on and off, thereby conserving electrical power.

We claim:

1. An album comprising a plurality of pages and another portion, is characterized by:
   a plurality of magnets positioned at respective relative locations on one of said portion or said plurality of pages; and
   a plurality of magnetic field sensor means positioned at respective relative locations on the other of said portion or said plurality of pages which substantially match the respective locations of the plurality of magnets for sensing the position of each page relative to the other portion.

2. The album of claim 1, wherein said other portion includes a front cover of the album.

3. The album of claim 1, wherein said other portion includes a back cover of the album.

4. The album of claim 1, wherein said other portion includes a front and back cover of the album.

5. The album of claim 1, wherein said other portion includes a binder for joining a front and back cover of the album together.

6. The album of claim 1, wherein said magnets are permanent magnets.

7. The album of claim 1, wherein said magnets are positioned on said pages.

8. The album of claim 1, further comprising:
   means for storing and playing back sound recordings associated with images to be secured to the pages;
   means for determining, based on an output signal from the magnetic field sensors, which images in the album are being presented to a viewer of the album; and means for causing the storing and playing means to play back a sound recording associated with the presented images.

9. An album page for presenting one or more images comprises a base sheet for supporting the images, means for securing images to the base sheet, and means for securing the base sheet to an album, is characterized by:

a permanent magnet attached to the base sheet in a predetermined position, such that when the base sheet is secured to an album having a magnetic field sensor, the base sheet can be moved to at least one position where a magnetic field from the permanent magnet can be sensed by the magnetic field sensor and at least one position where the magnetic field from the permanent magnet cannot be sensed by the magnetic field sensor, such that the position of the base sheet in the album relative to the magnetic field sensor can be determined.

10. An album, comprising:

a plurality of magnetic field sensor means positioned at respective relative locations on a portion of the album such that when a plurality of pages are secured to the album, each page having a permanent magnet positioned at a respective relative location on the page which substantially matches the respective location of one of the magnetic field sensors, the position of each page relative to the portion of the album can be sensed.

11. The album of claim 10, wherein said album portion includes a front cover of the album.

12. The album of claim 10, wherein said album portion includes a back cover of the album.

13. The album of claim 10, wherein said album portion includes a front and back cover of the album.

14. The album of claim 10, wherein said album portion includes a binder for joining a front and back cover of the album together.

15. The album of claim 10, further comprising:

means for storing and playing back sound recordings associated with images to be secured on the pages;

means for determining, based on an output signal from the magnetic field sensors, which images in the album are being presented to a viewer of the album; and means for causing the storing and playing means to play back a sound recording associated with the presented images.

* * * * *